Aug. 31, 1954   G. S. DOMAN   2,687,856
GYROSCOPIC CONTROL OF SUSTAINING ROTORS
Filed July 18, 1946
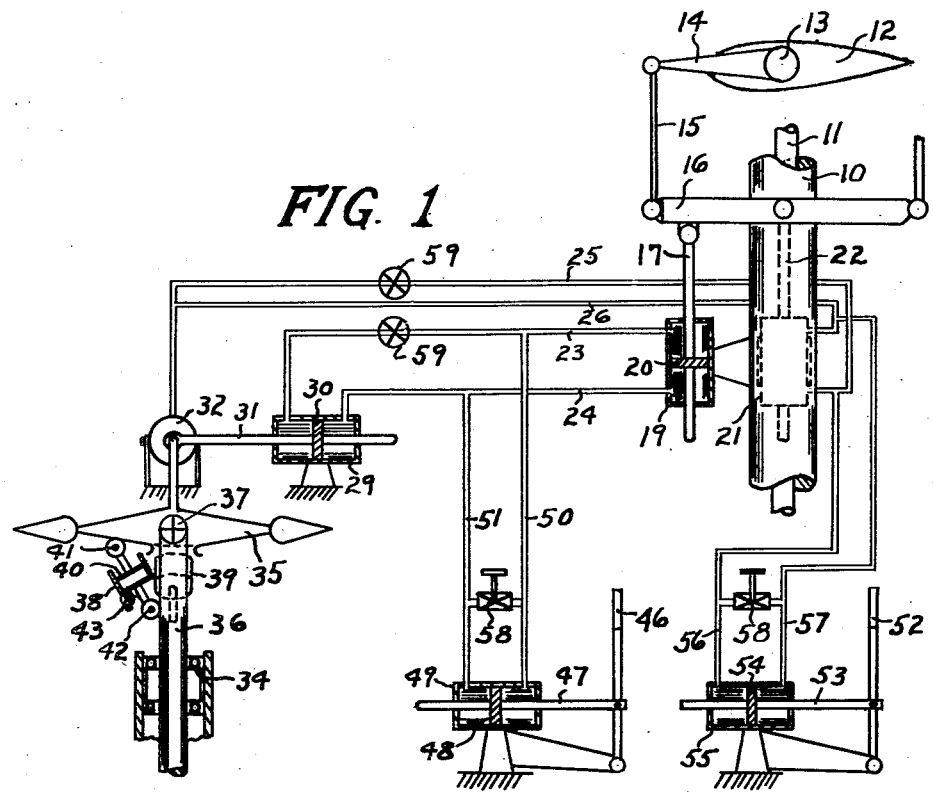
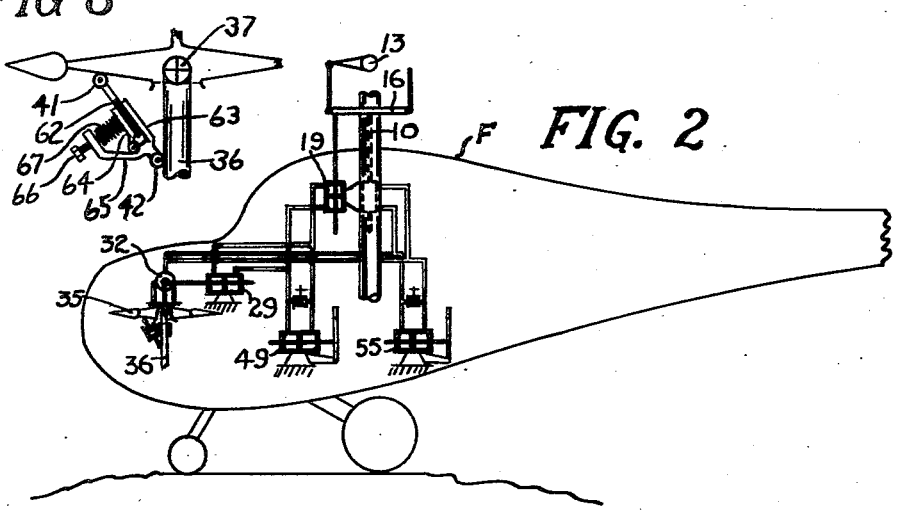
INVENTOR.
GLIDDEN S. DOMAN.
BY
*Bohleber, Fassett & Montstream*
ATTORNEYS Patented Aug. 31, 1954

2,687,856

UNITED STATES PATENT OFFICE 2,687,856

GYROSCOPIC CONTROL OF SUSTAINING ROTORS

Glidden S. Doman, Stamford, Conn., assignor to Doman Helicopters, Inc., a corporation of Delaware Application July 18, 1946, Serial No. 684,624

10 Claims. (Cl. 244—17.13)

1

The invention relates to a gyroscopic control of an azimuth plate which controls the pitch change of the blades of a sustaining rotor for helicopters and the like. One of the types of instability to which helicopters are subjected is the pendular swing of the fuselage which, when once started, tends to increase in amplitude, because the swing induces cyclic pitch change of the blades which in turn causes the rotor to tilt. Such pendular action can be checked by the pilot, but its occurrence prevents the pilot from flying or gliding with his hands off of the controls for any appreciable length of time, such as a minute or more. As a consequence the pilot cannot devote appreciable time to map reading or other duties, but must give substantially continuous attention to flying.

It is an object of the invention to construct a new and novel gyroscopic control for the azimuth plate of a rotary winged aircraft.

A further object is to provide a gyroscopic control for a rotor-sustained aircraft in which the gyroscopic member follows mean fuselage position, but is unaffected by short term swings of the fuselage such as its natural pendular motion.

Another object is to utilize the cooling fan as the gyroscopic element or member which provides a double use for the fan already provided upon the ship, and hence saves the weight necessary to be added when a separate gyroscopic member is provided.

Another object is to provide an hydraulic system for gyroscopic control of the azimuth plate combined with manual trim control of the azimuth plate which gyroscopic control is so constructed that the manual control does not affect the control provided by the gyroscopic means.

Other objects of the invention will be more apparent from the description which follows when taken in connection with the accompanying drawings illustrating a preferred embodiment thereof, in which:

Figure 1 is a diagrammatic view of the gyroscopic and trim control.

Figure 2 is a diagrammatic view of the control mechanism as applied to a helicopter or sustaining rotor aircraft.

Figure 3 is a view of friction dampers for the gyroscopic member.

The rotor of the aircraft is mounted upon a mast or pylon 10 which is fixed to the fuselage F of the aircraft, and the rotor may be rotated through a drive shaft 11 passing through the mast and connected with the motor of the aircraft. The rotor head has a plurality of blades 12, one of which is shown, having a blade shaft 13 to which is connected an arm 14, the end of which is connected through a link 15 to an azimuth plate 16 carried by the mast 10. The azimuth plate is mounted for universal inclination with respect to the mast in known fashion.

A pair of operating means is provided to change

2 the inclination of the azimuth plate and thereby secure variation in cyclic pitch change of the blades 12. The operating means illustrated includes an hydraulic cylinder 19 which may be carried by the mast 10, and having a piston 20 therein connected through a piston rod 17 with the azimuth plate 16. The second operating means includes a similar hydraulic cylinder 21 having a piston connected through a piston rod 22 with the azimuth plate at a point spaced 90° with respect to the point of attachment of the piston rod 22 therewith. A pipe 23 connects with the cylinder 19 upon one side of the piston 20 and a pipe 24 is connected with the cylinder 19 upon the other side of the piston 20. Similar pipes 25 and 26 are connected with the hydraulic cylinder 21. The pipes 23 and 24 are connected with an hydraulic driving cylinder or means 29 at opposite ends of the cylinder. A piston 30 is carried within the cylinder 29 and is connected by its piston rod 31 with a gyroscopic means to be described. The pipes 25 and 26 are likewise connected with a hydraulic cylinder 32 carried by the aircraft and having a piston which is connected by its piston rod to the gyroscopic means at a point at right angles to or 90° from the connection of the piston rod 31 therewith. The hydraulic cylinders 20, 29 and 21, 32, with their associated parts and connections constitute a pair of operating mechanisms between the gyroscope and the azimuth plate for controlling the position of the latter by the former. The hydraulic cylinders 29 and 32 constitute hydraulic operated means since they are operated by the gyroscope.

A gyroscopic means provides a relatively fixed reference plane for maintaining the azimuth plate 16 in a plane parallel therewith. The gyroscopic member of the gyroscopic means preferably is a cooling fan 35 for the motor, mounted upon the fuselage of the aircraft and driven by the motor for the aircraft through a drive shaft 36 mounted for rotation such as in bearings 34. The use of the cooling fan eliminates the necessity of providing a separate gyroscopic member which would increase the weight of the aircraft. Also, the fan is driven at high speed so that even though it is of relatively light weight it develops sufficient inertia or gyroscopic effect to resist adequately any change in its plane of rotation. Again the fan and its drive shaft may be made lighter, thereby further reducing weight, since gyroscopic fan stresses are virtually eliminated. The fan tends to and will remain fixed or substantially fixed in any given plane of rotation. The drive shaft 36 is connected with the motor to rotate the fan and the fan is mounted upon the drive shaft by a universal joint 37, preferably of the constant velocity type, so that it may universally incline with respect to the shaft 36.

Suitable means are provided to make the fan follow average or long term fuselage position, which means may be any suitable form of friction or viscous damping device, however, dash pots 38 and 39 are shown located at right angles with respect to each other. The dash pots have a piston 40 which is connected with the fan by means of a piston rod, the end of which is attached to the fan by a pivot 41 and the cylinder is connected or adapted to be connected with the drive shaft 36 through a pivot 42. The dash pot 39 is similarly constructed. A needle valve 43 may be provided in order to adjust the amount of resistance or damping offered by the dash pot. The fan will adjust itself toward perpendicularity with shaft 36 in the event of a new long term fuselage position by action of the small forces from the shaft transmitted to the fan through the damping means. The fan may be made to come into line with its shaft for such long term motion or mean fuselage position as rapidly or as slowly as desired by properly regulating the needle valves or other means to give the proper degree of damping. The damping is normally relatively soft so that the fan does not respond to or change its plane of rotation appreciably with short term pendular variations in position of the fuselage. Should the fuselage develop a pendular swing, the change in inclination of the drive shaft for the fan with respect to the latter would, through the soft damping means tend to and may change the inclination of the fan slightly. However, the pendular swing in the opposite direction would exert a similar and substantially equal force or tendency in the opposite direction and restore the fan to its original or average position. Any long term change in attitude of the fuselage would cause a gradual change in the plane of rotation of the fan.

The aircraft may be "trimmed" by means for changing the inclination of the azimuth plate relatively to the inclination or attitude of the fan or gyroscope. A trim stick 46 is provided in the fuselage to be manually operated by the pilot. The trim stick is connected through a piston rod 47 with a piston 48 carried in a hydraulic driving cylinder 49. The ends of the cylinder are connected by pipes 50 and 51 respectively to the pipes 23 and 24 which connect with opposite ends of the hydraulic cylinder 19 of the azimuth plate operating means. A similar trim stick 52 is connected by a piston rod 53 to a piston 54 within an hydraulic cylinder 55 with the pipes 25 and 26 respectively for the hydraulic cylinder 21. It will be noted that the hydraulic means is duplex in that control is provided in both directions for each of the azimuth plate operating means. It will be noted that the azimuth plate 16 may be moved to any position without movement of the gyroscopic member 35 because the connection is what may be termed a parallel connection in that each may operate independently of the other. Means are provided to synchronize each duplex system which means includes a valve 58 for each system connecting the pipes 50—51, and 56—57 respectively. Trim sticks 46 and 52 may be a single stick, in the preferred form, connected to both trim cylinder pistons in the same manner that the fan is connected to the pistons of the cylinders 29 and 32.

The gyroscopic control described operates in the following manner. With the aircraft in flight, the fan 35 is rotating at high speed and because of its gyroscopic action it tends to remain parallel with its initial plane of rotation. The fuselage and fan driving shaft 36 may swing violently in short term pendular motion, but the fan 35 remains in its plane of rotation so that the piston 30 and the like piston for the driving cylinder 32 are moved relative to their cylinders carried by the aircraft, and the azimuth plate 16 is caused to remain in a plane parallel to or in the same relative position with respect to the fan 35, irrespective of any inclination of the fuselage and mast 10. Thus the azimuth plate remains nominally undisturbed in space even though the fuselage may be tilting violently.

If a long term change in the position of the fuselage occurs, the fan 35 slowly changes its plane of rotation, from forces originating in the damping means because of relative inclination of the drive shaft and the axis of rotation of the fan. These forces slowly bring the fan into alignment with the axis of rotation of the drive shaft. A change in the plane of rotation of the fan moves the piston 30 or the like piston for cylinder 32 or both, and the same or an equivalent motion is transmitted, through the hydraulic system, to the cylinder 19 or 21 respectively or both cylinders. The new plane of rotation of the fan or gyroscopic member 35 changes the inclination of the azimuth plate 16 so that it is changed to a new position in space corresponding to the changed plane of rotation of the fan. It will be observed, therefore, that a gyroscopic control is provided which maintains a fixed azimuth control plane throughout short term pendular motion of the fuselage but adjusts the control plane to long term change of fuselage position.

If the pilot should desire to trim or change flight conditions for the aircraft, the trim stick 46 or 52 is moved to move its respective piston, which motion is transmitted through the hydraulic system to its respective cylinder 19 or 21, in a corresponding direction, to change the inclination of the azimuth plate 16. The trim control or stick is then locked or held in adjusted position so that the trim adjustment made is in a sense a fixed adjustment since it is altered usually but once for a particular flight condition. Shifting of weight in the aircraft or other reasons may require another adjustment, however, it usually remains fixed for any flight condition such as continued cruising. The gyroscopic action of the fan in conjunction with the resistance offered by the dash pots 38 or damping means is sufficient so that operation of either trim stick does not appreciably change the plane of rotation of the fan 35 through the cylinders 29 or 32. The motion of either trim stick therefore is transmitted to the hydraulic cylinders of the operating means and changes the inclination of the azimuth plate only.

At intervals it may be desirable to synchronize the hydraulic system. With the rotor running at low power on the ground the blade bearing stiffness transmits forces through the azimuth plate, the operating cylinders 19 and 21, and the hydraulic system tending to bring the azimuth plate to a position parallel with the rotor, which will occur if cylinders 19 and 21 are relieved of hydraulic pressure. Meanwhile the fan 35 is also being urged toward alignment with shaft 36. For synchronizing the valves 58 are then opened to connect the duplex fluid systems for flow of fluid from one to the other, and the pilot pushes the trim sticks to center stroke position. This equalizes the fluid in each of the duplex control systems, after which the valves 58 are closed. All cylinders of each operating means are synchronized and the aircraft is ready for flight. Synchronizing may also be made during flight if desired. In the event the gyroscope or fan should cease to function due to failure of the motor or any other reason, the fan may be disconnected from the system by closing the fluid valves 59.

There is shown in Figure 3, a damper of the friction type which may be substituted for the dash pot dampers shown in Figure 1. This friction damper includes a central friction plate 62 which is connected to one of the pivots and a pair of outer friction plates 63 and 64 connected to the other pivot. As illustrated, the central plate 62 is connected with pivot 41 and plate 63 is connected with pivot 42. Plate 64 is pivoted to a bracket 65 carried by the plate 63 and a spring 67 presses the two plates into contact with the central plate 62 to create friction between the plates. An adjusting screw 66 may be used to adjust the compression of the spring and thereby adjust the friction between the plates.

The control described is an addition to the usual pilot control of the azimuth plate (not shown) which pilot control is superimposed upon the gyroscopic control and the fixed trim control described. The pilot control for use in flight ordinarily includes, variation of the inclination of the azimuth plate, for changing cyclic blade angle and vertical shifting of the azimuth plate for collective change of the blade angle.

This invention is presented to fill a need for improvements in a gyroscopic control of a sustaining rotor. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gyroscope control for helicopters and the like having blades mounted for control of the pitch angle thereof, an azimuth plate mounted with the blades and at least one rotatable shaft comprising a gyroscope including a gyroscopic member, means mounting the gyroscopic member for rotation and universal inclination thereof, and damping means connected with the gyroscopic member rendering it fully responsive to long term changes in attitude of the fuselage but insensitive to short term changes in attitude, including means to connect the same to a rotatable shaft; a pair of hydraulic operating means operable in two directions including means adapted to connect the same to blades to vary the pitch thereof, hydraulic driving means for each operating means connected with and each actuated by the gyroscopic member for a different direction of inclination thereof to automatically vary the position of the operating means upon relative inclination of the gyroscopic member, a pair of hydraulic connections between each hydraulic driving means and its respective operating means, valve means in one of the hydraulic connections for each pair of hydraulic connections, manually controlled hydraulic trim means connected with the operating means to manually vary the position of the operating means, each hydraulic means being duplex for operation in two directions, the damping means and the gyroscopic effect of the gyroscopic member exerting sufficient resistance to render the gyroscopic member insensitive to the manually controlled hydraulic trim means, and valve means connecting one side of each hydraulic operating means with the other side to synchronize each hydraulic operating means as well as the hydraulic trim means and hydraulic driving means connected therewith.

2. A gyroscopic control for helicopters and the like having a rotatable shaft and a rotor head and blades mounted for control of the pitch angle thereof by an azimuth plate mounted for universal inclination thereof and adapted to be connected with the blades comprising a gyroscope including a gyroscopic member, means mounting the gyroscopic member for rotation upon a vertical axis including a universal joint for universal inclination of the gyroscopic member, means carried by the universal joint adapted to connect the same with a rotatable shaft, and at least one pair of damping means connected with the gyroscopic member at points angularly spaced 90° with respect to each other around the axis of the gyroscopic member for control in all planes of movement thereof including means carried by the damping means adapted to connect the same with a rotatable shaft, said damping means being fully responsive to along term change of attitude of the helicopter but insensitive to short term change of attitude; and a pair of operating mechanisms each connected with the gyroscopic member at points spaced 90° with respect to the other around the axis of the gyroscopic member and actuated by the latter upon relative inclination between the helicopter and the gyroscopic member, the operating mechanisms being adapted to be connected with the blades to vary the pitch of the latter with the inclination of the gyroscopic member.

3. A gyroscopic control for helicopters as in claim 2 including manually controlled means connected in parallel with each of the operating mechanisms to manually vary the position thereof independently of the gyroscopic means, and the damping means and gyroscopic effect of the gyroscopic member exerting sufficient resistance upon the gyroscopic member to render the latter insensitive to the manually controlled means.

4. A gyroscopic control for helicopters as in claim 3 in which the operating mechanisms each include an hydraulic operating means including means adapted to connect the same with the blades to vary the pitch thereof at two spaced points thereof, hydraulic operated means connected with the gyroscopic member, and fluid connections between the operating means and the operated means, and the manually controlled means are hydraulic means connected to the fluid connections.

5. A gyroscopic control for helicopters as in claim 4 in which each hydraulic means is duplex for operation in both directions, and valve means connecting one side of each hydraulic operating means with the other side to synchronize each hydraulic operating means as well as the hydraulic trim means and hydraulic driving means connected therewith.

6. A gyroscopic control for helicopters as in claim 5 in which the gyroscopic member carries fan blades for blowing air for cooling purposes.

7. A gyroscopic control for helicopters and the like having a rotatable shaft and a rotor head and blades mounted for control of the pitch angle thereof by an azimuth plate mounted for universal inclination thereof and adapted to be connected with the blades comprising a gyroscope including a gyroscopic member, means mounting the gyroscopic member for rotation upon a vertical axis including a universal joint for universal inclination of the gyroscopic member and means carried by the universal joint adapted to connect the same with a rotatable shaft, and at least one pair of damping means connected with the gyroscopic member at points angularly spaced 90° with respect to each other around the axis of the gyroscopic member for control in all planes of movement thereof including means adapted to connect the damping means with a rotatable shaft, said damping means being fully responsive to long term change of attitude of the helicopter but insensitive to short term change of attitude; and a pair of operating mechanisms each connected with the gyroscopic member at points spaced 90° apart around the axis of the gyroscopic member and actuated by the latter upon relative inclination between the helicopter and the gyroscopic member, the operating mechanisms being adapted to be connected with the blades to vary the pitch of the latter with the relative inclination of the gyroscopic member, manually controlled means connected in parallel with each of the operating mechanisms to manually vary the position thereof independently of the gyroscopic means and the damping means, and the gyroscopic effect of the gyroscopic member exerting sufficient resistance upon the gyroscopic member to render the latter insensitive to the manually controlled means, and fan blades carried by the gyroscopic member for cooling purposes.

8. A gyroscopic control for helicopters and the like having a rotor head and blades mounted for control of the pitch angle thereof by an azimuth plate for universal inclination thereof and adapted to be connected with the blades comprising a gyroscope including a gyroscopic member, means mounting the gyroscopic member for rotation upon a vertical axis including a shaft, a universal joint connecting the shaft with the gyroscopic member for universal inclination of the latter with respect to the shaft, and at least one pair of damping means connected between the gyroscopic member at points angularly spaced 90° with respect to each other around the axis of the gyroscopic member and the shaft for control in all planes of movement thereof, said damping means being fully responsive to long term change of attitude of the helicopter but insensitive to short term change of attitude; and a pair of operating mechanisms each connected with the gyroscopic member at points spaced 90° apart around the axis of the gyroscopic member and actuated by the latter upon relative inclination between the helicopter and the gyroscopic member, the operating mechanisms being adapted to be connected with the blades to vary the pitch of the latter with the inclination of the gyroscopic member.

9. A gyroscopic control for helicopters and the like having a rotatable vertical shaft and a rotor head and blades mounted for control of the pitch angle thereof by an azimuth plate mounted for universal inclination thereof and adapted to be connected with the blades comprising a gyroscope including a gyroscopic member, means mounting the gyroscopic member for rotation upon a vertical axis including a universal joint for universal inclination of the gyroscopic member and means carried by the universal joint adapted to connect the same with a rotatable shaft, and at least one pair of damping means connected with the gyroscopic member at points angularly spaced 90° with respect to each other around the axis of the gyroscopic member for control in all planes of movement thereof including means carried by the damping means adapted to connect the same with a rotatable shaft, said damping means being fully responsive to long term change of attitude of the helicopter but insensitive to short term change of attitude; and a pair of operating mechanisms each connected with the gyroscopic member at points spaced 90° apart around the axis of the gyroscopic member and actuated by the latter upon relative inclination between the helicopter and the gyroscopic member, the operating mechanisms each including an hydraulic operating means having means adapted to connect the same with the blades to vary the inclination of the latter with the inclination of the gyroscopic member, hydraulic operated means connected with the gyroscopic member, and fluid connections between the operating means and the operated means; manually controlled hydraulic means connected to the fluid connections in parellel with each of the operating mechanisms to manually vary the position thereof independently of the gyroscopic means and the damping means, and the gyroscopic effect of the gyroscopic member exerting sufficient resistance upon the gyroscopic member to render the latter insensitive to the manually controlled means, and fan blades carried by the gyroscopic member for cooling purposes.

10. In an aircraft, a body, a rotary member mounted on said body for rotation about a generally upright axis, blade means, means mounting said blade means on said rotary member for change of the effective incidence of said blade means, inertia means rotatable about an axis generally parallel to said upright axis, means mounting said inertia means on said body for universal inclination relative thereto, means connecting said inertia means with said blade means to control the effective incidence of said blade means, a pilot operable control means interconnecting said blade means and said inertia means and adjustable to vary the relative inclination of the planes of rotation of said rotor and said inertia means, and friction type damping means interconnecting said inertia means and said body and arranged to damp inclination movements of said inertia means relative to said body.

References Cited in the file of this patent

UNITED STATES PATENTS

| Number | Name | Date |
|---|---|---|
| 2,021,470 | Upson | Nov. 19, 1935 |
| 2,165,451 | Carlson | July 11, 1939 |
| 2,238,300 | Zand | Apr. 15, 1941 |
| 2,242,806 | Wunsch | May 20, 1941 |
| 2,299,117 | Von Menteuffel | Oct. 20, 1942 |
| 2,368,698 | Young | Feb. 6, 1945 |
| 2,384,516 | Young | Sept. 11, 1945 |
| 2,396,038 | Bossi | Mar. 5, 1946 |
| 2,427,939 | Woods | Sept. 23, 1947 |
| 2,443,192 | Moeller | June 15, 1948 |

FOREIGN PATENTS

| Number | Country | Date |
|---|---|---|
| 47,826 | Austria | May 10, 1911 |
| 545,187 | Great Britain | May 14, 1942 |